United States Patent

[11] 3,588,680

| [72] | Inventor | Stuart E. Athey |
| | | Troy, Ohio |
| [21] | Appl. No | 717,497 |
| [22] | Filed | Apr. 1, 1968 |
| [45] | Patented | June 28, 1971 |
| [73] | Assignee | The Hobart Manufacturing Company |
| | | Troy, Ohio |

[54] ELECTRONIC TESTING APPARATUS
7 Claims, 5 Drawing Figs.

[52] U.S. Cl..................................................... 324/28,
324/161, 340/264
[51] Int. Cl....................................................... G01r 31/02
[50] Field of Search........................................... 324/28, 68,
69, 70, 70 (CG), 98, 158 (MG), 158 (D);
340/263, 264, 271; 318/325, 462, 490

[56] References Cited
UNITED STATES PATENTS
| 1,805,192 | 5/1931 | Smith........................ | 324/28 |
| 3,045,184 | 7/1962 | Stetzler................... | 324/158 |

Primary Examiner—Michael J. Lynch
Attorney—Marechal, Biebel, French and Bugg

ABSTRACT: Rotary switch actuators are tested by connection to testing apparatus having a control to drive the actuator, a switch arranged to be opened or closed by the actuator, a tachometer sensing the speed of operation as the motor drives the actuator at varying speeds, and a comparator circuit is arranged to receive an output from the tachometer and to have one or more inputs preset to values corresponding to tachometer output at predetermined speeds. The comparator circuit output is connected to a gate circuit and the gate circuit also receives an input from the switch, whereby a signal or lack of a signal from the gate circuit output indicates success or failure of an actuator under test to operate the switch within desired speed limits.

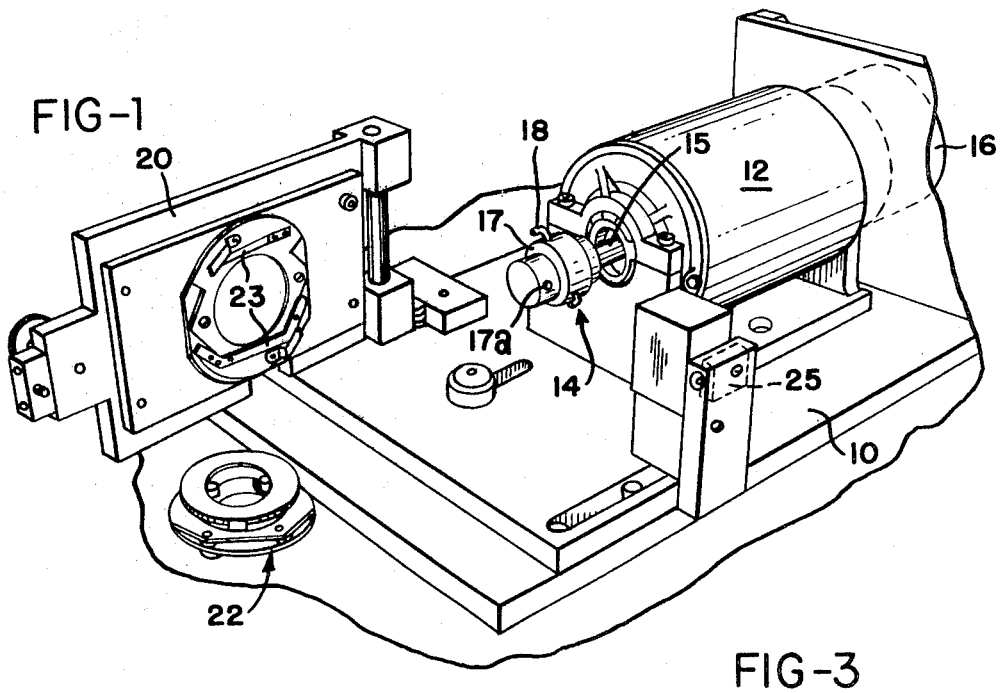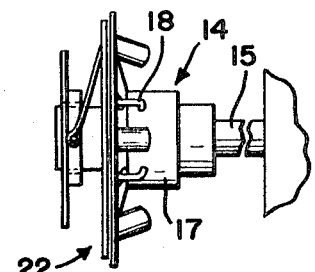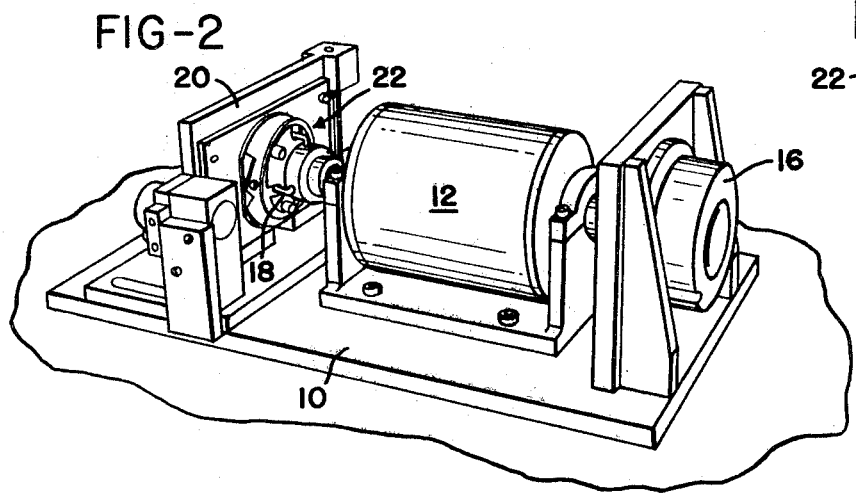
INVENTOR
STUART E. ATHEY
BY
Mareschal, Biebel, French & Bugg
ATTORNEYS

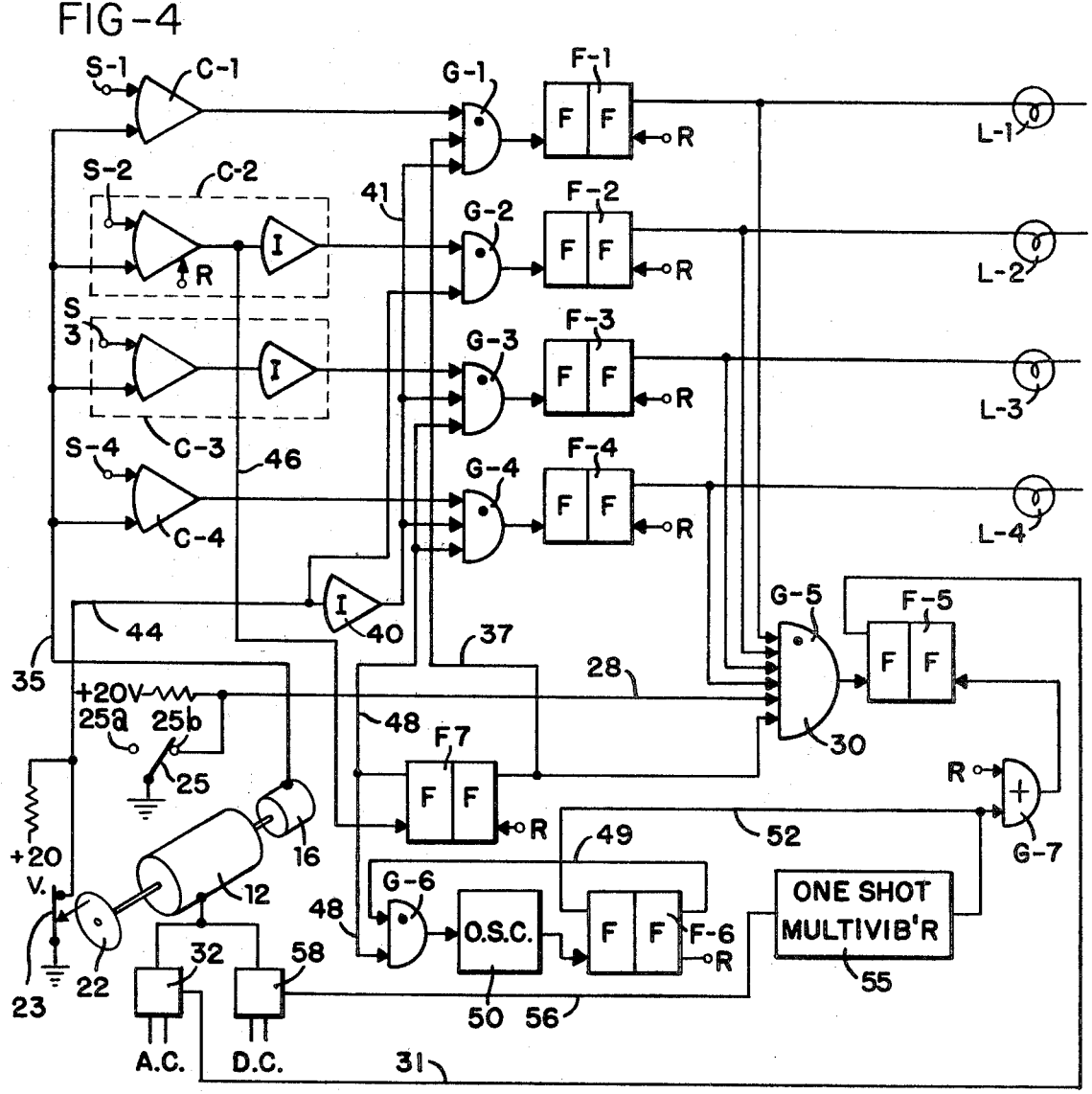

ELECTRONIC TESTING APPARATUS

BACKGROUND OF THE INVENTION

By way of example of an actuator which may be tested according to the invention. U.S. Pat. No. 2,768,260 shows a centrifugally operated switch designed to be closed at rest and opened when its actuator is rotated at or above a predetermined speed. There are many known uses for such switches, one being in the starting circuit of electrical induction motors. There the switch, when closed, completes a circuit through the starting winding, and this circuit is opened when the motor reaches a predetermined speed after starting. It is important that this switch open at the predetermined speed (or within certain tolerance) in order to assure the desired starting characteristics will be obtained from the motor. If the switch opens too soon, the starting torque may not be adequate, and if the switch opens too late, or not at all, the starting winding of the motor may be damaged.

SUMMARY OF THE INVENTION

The present invention provides apparatus whereby rotary actuators of this type can be tested under actual operating conditions, and whereby each actuator may be tested, rather than random testing with statistical elimination of batches in the event that a test is failed. The invention utilizes solid-state testing circuits which are reliable and require very little power for operation. Basically, the testing device incorporates a number of comparator circuits which are used to compare an output signal, such as a voltage level, from the device under test, or a transducer operated by the device being tested, with a reference voltage preset to a level at which the output should be available if the actuator under test is to be acceptable. The output for the comparator circuits will in turn be connected to memory circuits which are control indicators to show whether or not the actuator under test has passed or failed the test.

Therefore, the primary object of this invention is to provide a novel testing device for rapidly testing rotary actuators and the like, particularly for centrifugally operated switches, to indicate whether or not the actuators are acceptable for service under predetermined conditions, and another object of the invention is to provide such testing apparatus which may easily and quickly operate, thereby making it economical to test each newly manufactured (or reconditioned) actuator for the purpose of determining its acceptability for use under operating conditions where relatively close tolerances are necessary for proper operation.

Other objects and advantages of the invention will be apparent from the following descriptions, the accompanying drawings and the appended claims.

In the drawings:

FIGS. 1 and 2 are diagrammatic views of the mechanical parts of a typical testing device as provided by the invention;

FIG. 3 is a detail view of a typical actuator received on the mounting adapter of the testing device;

FIG. 4 is a logic diagram of the electronic parts of testing apparatus according to the invention; and FIG. 5 is an explanatory diagram of the logic symbols used in FIG. 4.

Referring to the drawing, which shows a preferred embodiment of the invention, a base 10 provides a mounting for an electric motor 12, and this motor carries a drive adapter 14 at one end of its rotor shaft 15, and the other end of this shaft is coupled to an electric tachometer or speed transducer 16. The output of the tachometer provides a signal which will vary directly with the motor speed.

The adapter includes a hub 17 with a detent 17a for holding an actuator against axial movement, and one or more prongs 18 which engage slots in the plate of the actuator to rotate it with the hub (FIG. 3).

Opposite the adapter 14 is a test mounting plate 20, which is conveniently hinged to swing toward and away from the adapter for easy loading and unloading of the actuators under test. One such actuator 22 is shown placed on adapter 14 (in FIGS. 2 and 3) to be rotated therewith. The plate 20 holds a test switch 23, which will be closed by the actuator when the plated is moved into test position. As the actuator is then rotated, it will open switch 23 at a certain rotational speed, and the primary function of the test device is to determine whether an actuator under test will cause this switch operation at the desired speed. The actuators can be readily fitted to adapter 14, and moving plate 20 to its test position will bring switch 23 into contact with the actuator, and will also close a starting switch 25 to signal that a test has begun.

The starting switch 25 is a single-pole double-throw switch which is arranged to engage one of its contacts 25a when the plate 20 is in its opening or reloading position. When this plate is moved to its test position the switch 25 transfers to its opposite open contact 25b, and this in turn produces an input on line 28 to the AND gate 30.

There are four memory flip-flop circuits F-1, F-2, F-3, and F-4 which function as the test memory outputs of the apparatus. Referring to the logic symbols in FIG. 4, when an input signal to the set input of a flip-flop occurs, there will be a high-level output from its set output, and similarly when there is a high-level reset input there will be a high-level reset output from the flip-flop circuit. The AND gate circuits are such that there must be two or more coinciding high-level inputs in order to obtain a high-level output. In the OR gate circuit, if any one of the inputs is at a high level there will be a high-level output. The inverter circuit merely inverts its input to the opposite level, such that the output is always the inverse of the input. The comparator circuits are essentially operational amplifier circuits which are adapted to receive a test setting input, labeled S, and a test input labeled T. In the conventional arrangement, the test input must at least equal the set point input to the comparator before there will be a high-level output. Circuits for performing these logic functions are well known in the art, and suitable circuit arrangements are shown in copending application Ser. No. 560,308, filed June 24, 1966 now U.S. Pat. No. 3,402,600 issued Sept. 24, 1968, entitled MOTOR TESTING APPARATUS and assigned to the same assignee as this application.

In addition to the four memory flip-flop circuits, there are three control flip-flop circuits F-5, F-6, and F-7 which control the beginning and sequence of testing. When the plate 20 is moving to its open position, and switch 25 engages its back contact 25a, this produces a reset input to each of the flip-flop circuits, except F-5, and thus all except F-5 will immediately reset. The reset input to flip-flop circuit F-5 is through the OR gate circuit G-7, hence F-5 also is reset at this time, in anticipation of the beginning of a new testing operation on an actuator.

When an actuator 22 is placed on adapter 14, the plate 20 is then moved to its closed or test position. This causes switch 25 to transfer to its contact 25b and the resulting signal on line 28 completes the enabling inputs to AND gate 30. The other five inputs are from the reset outputs of flip-flop circuits F-1 through F-4 and F-7, all of which have been reset to produce high-level signals on their reset outputs. A high-level signal appears on the output of AND gate G-5 and this sets flip-flop F-5, and the set output of this flip-flop circuit on line 31 actuates a power supply control 32 adapted to connect the motor to the AC power source 33. This causes power to be applied to the motor 12, which immediately begins to rotate the adapter 14 and the tachometer 16.

The tachometer output on line 35 is a varying voltage signal which changes with speed, hence the output signal on line 35 will increase with an increase in speed. In a typical embodiment, the voltage level on line 35 is zero with the tachometer at rest, and increases in a generally linear manner. This tachometer output is connected into each of the comparator circuits C-1, C-2, C-3, and C-4. It will be noted that the comparator circuits C-2 and C-3 include inverters which provide an inverted output, for reasons which will be explained. In addition, the comparator C-2 is of the latching type, and includes a reset input which receives a signal along with all the other reset circuits when the plate 20 is in its open position. Also, it should be noted that since the flip-flops F-1 through F-4 have been reset, in addition to supplying high-level inputs to AND gate G-5, each of these flip-flops also causes a corresponding testing lamp L-1—L-4 to be illuminated.

The test switch 23 is normally closed, since the actuator at rest is constructed to permit this switch to close, as required of the starting switch in an electrical motor. As the motor 12 accelerates the actuator 22 the first test is to determine whether the actuator will open the switch after a predetermined minimum speed. In a typical example, the input setting for the input S-1 to the comparator C-1 will correspond to a tachometer output of 2,500 r.p.m. The signal on line 35 must equal or exceed this value in order for the comparator C-1 to produce a high-level output. If this occurs, then the output from C-1 to the first test AND gate circuit G-1 will go to a high level and tend to enable that gate. The second input to AND gate G-1 is on line 37 which leads from the reset output of flip-flop F-7, and since this flip-flop is reset at the time, this output also will tend to enable G-1.

The third input to G-1 is from the inverter circuit 40, via line 41. The input to this inverter circuit is line 44 which is connected through a suitable resistor to a high-voltage source, and also is connected to the normally closed test switch 23. With this switch closed, the input to inverter circuit 40 will be at a higher level, thus its output will be at a lower level tending to inhibit each of the test AND gate circuits G-1, G-3, and G-4, whereas line 44 is connected directly to the test gate G-2 and tends to enable it when the others are inhibited, and vice versa.

In order to obtain the third enabling input to AND gate G-1, the test switch 23 must be open, whereby the line 41 will go to a higher level and there will be a high-level output from G-1 to the first memory flip-flop F-1, changing it to its set condition and thereby extinguishing lamp L-1 and also inhibiting AND gate G-5. It follows that in order to have an output from AND gate G-1 the tachometer must indicate that the actuator under test has reached a predetermined speed (for example 2,500 r.p.m.) and the actuator has not yet opened the test switch 23.

The next test operation is to determine if the actuator will function below a predetermined maximum speed, which in a typical example may be 2,800 r.p.m. The reference input S-2 to the comparator C-2 is set to a value corresponding to a tachometer output at 2,800 r.p.m. As shown in the logic diagram, the comparator includes an inverter circuit which actually supplies the output signal to the second test AND gate G-2. When the tachometer input to the comparator C-2 reaches 2,800 r.p.m., the output of the comparator portion of this circuit will go to a high level, and this output will be inverted resulting in a low-level output to AND gate G-2. When this occurs the comparator circuit latches, and this condition remains until there is a reset signal. Therefore, up until the time that the tachometer output reaches 2,800 r.p.m., the output from circuit C-2 will tend to enable G-2, but when the actuator reaches 2,800 r.p.m., the input to AND gate G-2 from the comparator circuit C-2 will be such as to inhibit that gate. The test line 44 from the test switch 23 is connected directly to provide the other input to AND gate G-2, and therefore a high-level enabling signal will appear on this line if switch 23 is open. It follows that the actuator must open switch 23 before reaching 2,800 r.p.m. if there is to be a high-level output from AND gate G-2. When this occurs the output of G-2 will set memory flip-flop F-2, and this in turn will cause the test lamp L-2 to be extinguished.

At the same time, there is a direct or noninverted output on line 46 from the comparator circuit C-2, specifically ahead of the inverter therein. This line leads to the set input of flip-flop F-7, and as soon as the tachometer reaches 2,800 r.p.m., as previously explained, the signal on line 46 will go to a high level. The set output of F-7 is connected to line 48, which provides inputs to test AND gates G-3 and G-4, respectively, and also to control AND gate G-6. The other input to AND gate G-6 is from the reset output of flip-flop F-6, through line 49. This line will be at a higher level, since flip-flop F-6 has been reset since the beginning of the test. When flip-flop F-7 is set there will be two high-level inputs to AND gate G-6, resulting in its being enabled and providing a high-level output which is connected to trigger an oscillator circuit 50. This oscillator is of the type which will provide an output after a predetermined time delay, for example about one-half second or slightly less. Its output is connected to the set input of flip-flop F-6, and will set that flip-flop, as a result of which AND gate G-6 will be inhibited.

In the meantime, motor 12 continues to accelerate the actuator, thus it is driven beyond its specified maximum operating speed, 2,800 r.p.m. in the example. When flip-flop F-6 is set, its set output on line 52 provides a high-level input to OR gate G-7, and its output in turn resets flip-flop F-5. The high-level enabling signal on line 31, from the set output of F-5, is accordingly discontinued, and the AC power supply to the motor 12 is turned off.

Line 52 also is connected to trigger a one-shot multivibrator or oscillator circuit, indicated at line 55. The output of this multivibrator is connected through line 56 to a dynamic brake controller 58, which in turn controls the application of a DC source to the motor 12. The output of multivibrator 55 remains at an enabling level for approximately two seconds, during which time DC power is applied to the motor 12 to cause dynamic braking of the motor, whereby the system and the actuator under test is decelerated.

During this time AND gate G-1 is inhibited, since line 37 has dropped to a low level when F-7 was set. The AND gate G-2 remains inhibited because of the inverted output from comparator C-2, which resulted when the test apparatus was allowed to accelerate beyond 2,800 r.p.m. Therefore, whatever may occur during the deceleration has no effect upon the results of the acceleration test, and lamps L-1 and L-2 will remain in whatever condition they achieved during the initial part of the test.

The comparator circuit C-3 includes the comparator and inverter as shown, and its set point input S-3 is set to a predetermined value, for example 1,900 r.p.m. As long as the tachometer output exceeds this value, the output from the comparator section of this circuit will be high and the output from the inverter section will be at a low level, tending to inhibit test AND gate G-3. Since F-7 has been set, its set output will be at a higher level tending to enable AND gate G-3, and if the test switch is still open, there will be a high-level signal on line 44, which is inverted by the inverter circuit 40, and hence a low-level signal on line 41 inhibits AND gate G-3. As soon as the apparatus slows below 1,900 r.p.m. the inverted output of the comparator circuit C-3 will go to a high level to enable G-3, for as soon as the test switch 23 closes there will be a low level on line 44, hence a high level on line 41 tending to enable G-3. If, therefore, the test switch 23 is permitted to close below 1,900 r.p.m. all three inputs to test AND gate G-3 will be at a high level and the resultant output to the memory flip-flop F-3 will be a set signal which will cause the indicator lamp L-3 to be extinguished. This shows that the actuator did allow the test switch to reopen.

The comparator circuit C-4 has its test setting input S-4 adjusted to correspond to the tachometer output at a substantially lower speed, such as 1,300 r.p.m. Therefore, the output from comparator C-4 will be at a higher level so long as the tachometer output exceeds a value equivalent to 1,300 r.p.m. This output thus provides an enabling input to the fourth test AND gate circuit C-4. The other inputs to this AND gate are from line 48, the set output of control flip-flop F-7, and from the output of inverter circuit 40. Since F-7 has already been set, there will be a higher level signal on line 48 and hence an enabling input to AND gate G-4 from that line. In order to have an enabling higher level signal from inverter 40, it is necessary to have a lower level signal on line 44, and this requires that the test switch 23 be closed. Therefore, the test switch 23 must close before the actuator decelerates to 1,300 r.p.m. in order to achieve an output from AND gate G-4. If this occurs the fourth test memory flip-flop F-4 will be set and the test lamp L-4 will be extinguished.

Since the dynamic braking circuit is already actuated, the motor 12 will be decelerated rapidly, and will come to a stop quickly. The actuator under test can be removed by opening the plate 20, and this of course moves switch 25 to its back contact 25a, providing a reset input to all of the reset circuits and preparing the test device for the next operation.

If the actuator has successfully completed the test, all four of the lamps L-1—L-4 should be extinguished. This indicates that the actuator successfully opened the test switch between 2,500 and 2,800 r.p.m., and that the actuator permitted the test switch to close, during deceleration, between 1,900 and 1,300 r.p.m. If the actuator under test does not function within these tolerances, a corresponding one of the test lamps will remain illuminated, indicating to the operator which one of the tests were failed, and thereby providing information which may be useful in repairing the actuator to meet the specified requirements.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:

1. Testing apparatus for rotary actuators, comprising a selectively operable motor and an adapter driven by said motor and arranged to hold an actuator for testing, sensing means movably mounted adjacent said adapter between a test position wherein an actuator on said adapter can control said sensing means and a loading position where an actuator can be removed from or loaded on said adapter, tachometer means driven by said motor to provide a signal varying with the speed of the actuator on said adapter, at least one comparator circuit, means establishing a first reference input to said one comparator circuit corresponding to the output of said tachometer means at a predetermined speed, said tachometer means having a connection proving a further input to said one comparator circuit, a first output gate circuit having an input connection from said one comparator circuit and a further input connection from said sensing means whereby said gate circuit will provide a predetermined output signal in response to a predetermined relationship between the output of said one comparator circuit and the condition of said sensing means, and means for indicating an output from said gate circuit corresponding to the success or failure of the actuator under test to operate the sensing means within the speed limits established by said reference input.

2. Testing apparatus as defined in claim 1 wherein said means for indicating includes a bistable device driven by the output of said gate circuit, means for resetting said bistable device upon movement of said sensing means to its loading position, and indicator means controlled by said bistable device to indicate a change in condition thereof caused by an output from said gate circuit during testing of an actuator.

3. Testing apparatus as defined in claim 2, including a second comparator circuit and means establishing a second reference input to said second comparator circuit corresponding to a different rotational speed from said first reference input to said one comparator circuit, a connection from said tachometer means to said second comparator circuit, a second bistable device corresponding to said second comparator circuit and means for setting said second bistable device to a predetermined condition, a second output gate circuit from said second comparator circuit to said second bistable device to change the condition of the second bistable device according to the relation of its reference input and its input from said tachometer means, and second indicator means controlled by said second bistable device for indicating the success or failure of the actuator to function within the rotational speed limits established by said reference inputs.

4. Testing apparatus for rotary actuators, comprising a selectively operable motor and an adapter driven by said motor and arranged to hold an actuator for testing, sensing means movably mounted adjacent said adapter between a test position wherein an actuator on said adapter can control said sensing means and a loading position where an adapter can be removed from or loaded on said adapter, signal means driven by said motor to provide an electrical signal varying with the speed of the actuator on said adapter, first and second comparator circuits each having inputs from said signal means, first and second reference inputs to a corresponding one of said comparator circuits providing reference inputs corresponding to the minimum and maximum rotational speeds at which said actuator should operate, and circuit means controlled by said comparator circuits and responsive to the speed at which an actuator under test operates said sensing means to provide an indication as to whether or not the actuator under test operated said sensing means at a speed within the range established by said reference inputs.

5. Testing apparatus for rotary actuators, comprising:

a selectively operable motor and an adapter driven by said motor and arranged to hold an actuator for testing;

sensing means movably mounted adjacent said adapter between a test position wherein an actuator on said adapter can control said sensing means and a loading position where an adapter can be removed from or loaded on said adapter;

signal means driven by said motor to provide an electrical signal varying with the speed of the actuator on said adapter;

first and second comparator circuits each having inputs from said signal means;

first and second reference inputs to a corresponding one of said comparator circuits providing reference inputs corresponding to the minimum and maximum rotational speeds at which said actuator should operate;

circuit means controlled by said comparator circuits and responsive to the speed at which an actuator under test operates said sensing means to provide an indication as to whether or not the actuator under test operated said sensing means at a speed within the range established by said reference inputs;

a control circuit for said motor operable to cause said motor to accelerate an actuator under test beyond the maximum speed at which it is designed to operate to insure that the actuator under test will operate even though it did not function within the range defined by said reference inputs;

means for disabling said first and second comparator circuits and for disabling said motor to cause the actuator under test to decelerate;

third and fourth comparator circuits having corresponding reference means establishing a speed range within which the actuator is designed to function during the decelerating motion;

input connections from said signal means to said third and fourth comparator circuits; and circuit means including connections from said sensing means and from said comparator circuits for indicating whether or not said sensing means also operated within the speed range established by said third and fourth reference inputs during the deceleration of the actuator under test.

6. Testing apparatus as defined in claim 5, wherein said means for decelerating the motor includes a circuit connected for dynamic braking of said motor to provide for controlled deceleration of the actuator under test.

7. Testing apparatus as defined in claim 5, wherein said circuit means controlled by said comparator circuits include AND gate circuits having inputs from the outputs of corresponding comparator circuits, each of said AND gate circuits also having inputs from said sensing means, flip-flop circuits connected to be reset in response to movement of said sensing means to its test position, each of said AND gate circuits having an output connected to set a corresponding one of said flip-flop circuits and indicator means controlled by said flip-flop circuits to indicate whether or not an actuator under test has operated the sensing means within the limits determined by said reference inputs.